United States Patent
Lee et al.

(10) Patent No.: US 10,992,202 B2
(45) Date of Patent: Apr. 27, 2021

(54) SLOTLESS ELECTRIC MOTOR AND COIL UNIT THEREOF

(71) Applicant: INDUSTRY-UNIVERSITY COOPERATION FOUNDATION HANYANG UNIVERSITY, Seoul (KR)

(72) Inventors: Ju Lee, Seoul (KR); Sung Hong Won, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 32 days.

(21) Appl. No.: 16/332,237

(22) PCT Filed: Sep. 19, 2017

(86) PCT No.: PCT/KR2017/010229
§ 371 (c)(1),
(2) Date: Mar. 11, 2019

(87) PCT Pub. No.: WO2018/052268
PCT Pub. Date: Mar. 22, 2018

(65) Prior Publication Data
US 2019/0273409 A1    Sep. 5, 2019

(30) Foreign Application Priority Data
Sep. 19, 2016  (KR) .................. 10-2016-0119071

(51) Int. Cl.
*H02K 3/04* (2006.01)
*H02K 3/47* (2006.01)
*H02K 3/28* (2006.01)

(52) U.S. Cl.
CPC ............. *H02K 3/47* (2013.01); *H02K 3/04* (2013.01); *H02K 3/28* (2013.01)

(58) Field of Classification Search
CPC .. H02K 3/00; H02K 3/04; H02K 3/28; H02K 3/37; H02K 3/47
(Continued)

(56) References Cited

U.S. PATENT DOCUMENTS 5,731,645 A * 3/1998 Clifton ................ F16C 32/0459
310/178
6,590,355 B1 * 7/2003 Kikuchi .............. G03F 7/70716
310/12.06
(Continued)

FOREIGN PATENT DOCUMENTS

JP          7-6705 Y2    2/1995
KR  10-2004-0003930 A    1/2004
(Continued)

OTHER PUBLICATIONS

International Search Report for PCT/KR2017/010229 dated Jan. 12, 2018 [PCT/ISA/210].
(Continued)

*Primary Examiner* — Quyen P Leung
*Assistant Examiner* — Eric Johnson
(74) *Attorney, Agent, or Firm* — Sughrue Mion, PLLC

(57) ABSTRACT

Disclosed are a slotless electric motor and a coil unit thereof. In the coil unit of the slotless electric motor, a first coil and a second coil overlap each other while a first end turn of the first coil and a first end turn of the second coil face each other and a first coil-side of the second coil is inserted between two coil-sides of the first coil, wherein each of the first coil and the second coil comprises two coil-sides parallel to each other, ends of the two coil-sides are connected through a first end turn and a second end turn having (Continued)

a curved shape, respectively, and the first end turn is bent to make a pre-configured angle with respect to the two coil-sides.

5 Claims, 6 Drawing Sheets

(58) Field of Classification Search
USPC .......................................... 310/12.21–12.23
See application file for complete search history.

(56) References Cited

U.S. PATENT DOCUMENTS

| 9,148,047 B2* | 9/2015 | Hsu ..................... H02K 41/031 |
| 2002/0079775 A1* | 6/2002 | Janssen ................... H01F 41/04 |
| | | 310/208 |
| 2003/0151314 A1* | 8/2003 | Mori ..................... H02K 41/03 |
| | | 310/12.22 |
| 2003/0155818 A1* | 8/2003 | Koyanagawa ......... H02K 41/03 |
| | | 310/12.04 |
| 2007/0138897 A1* | 6/2007 | Asaba et al. ............ A61P 25/14 |
| | | 310/208 |
| 2010/0225193 A1* | 9/2010 | Clark ................... H02K 15/063 |
| | | 310/208 |
| 2013/0062986 A1* | 3/2013 | Takeuchi ................. H02K 3/47 |
| | | 310/208 |

FOREIGN PATENT DOCUMENTS

| KR | 10-0804810 B1 | 2/2008 |
| KR | 10-1053921 B1 | 8/2011 |
| KR | 10-1500317 B1 | 3/2015 |

OTHER PUBLICATIONS

Korean Office Action for Application No. 10-2016-0119071 dated Jul. 1, 2017.
Korean Notice of Allowance for Application No. 10-2016-0119071 dated Aug. 8, 2017.

* cited by examiner

SLOTLESS ELECTRIC MOTOR AND COIL UNIT THEREOF

CROSS-REFERENCE TO RELATED APPLICATIONS

This application is a National Phase Application of PCT International Application No. PCT/KR2017/010229, which was filed on Sep. 19, 2017, and which claims priority from Korean Patent Application No. 10-2016-0119071 filed with the Korean Intellectual Property Office on Sep. 19, 2016. The disclosures of the above patent applications are incorporated herein by reference in their entirety.

BACKGROUND

1. Technical Field

The present invention relates to a slotless electric motor and a coil unit thereof.

2. Description of the Related Art

In a typical electric motor, the stator includes teeth that are formed by slots, which are the parts where the armature coils are wound, and iron cores, which serve as pathways for magnetic flux generated at the armature coils. Such a slotted structure maximizes permeance and thus provides a high air gap flux density, but the occurrence of a cogging torque is unavoidable.

Also, the slotless structure, also referred to as the coreless structure, is a structure having no slots as the name implies and is characterized by creating a very uniform torque without a cogging torque. The slotless structure provides advantages in terms of noise and vibration, and since the amount of iron core used is greatly reduced, there is low iron loss, and the mechanical time constant is small, thereby allowing greater controllability.

However, the armature winding of such slotless motor is of an air core structure and is not wound around iron cores, and as the coil has to be coupled to the stator using only the shape of the coil itself, the manufacturability may be lower compared to the core type electric motor.

FIG. 1 to FIG. 3 illustrate the coil structures of slotless motors according to the related art.

The coil structure of the slotless motor illustrated in FIG. 1 is of a wound structure having the coils disposed in a roof tile arrangement. That is, in the coil structure of FIG. 1, the two coil-sides forming one turn are made to have different heights, so that several coils may be superimposed in a mutually interlocking arrangement. Thus, in the coil structure of FIG. 1, there are no changes in the air gaps when the windings are continued along the circumference of the stator, and as the coils interlock with one another, securing the coils is made easier, providing a benefit also in terms of manufacture.

However, the problems with the coil structure of FIG. 1 are that: it is difficult to manufacture the coils to have different heights on either side, failure to produce the many coils in the same shape would cause difficulty also in lining the windings via interlocking coils, and differences in the shapes of the coils forming the respective phases can cause phase imbalance.

The coil structure illustrated in FIG. 2 has several coils stacked, each separated by a particular distance along the circumference direction of the stator, where the parts at which the thickness of the coils is increased due to the coils being stacked one over the other and pressing against each other are compressed, so as to minimize the effective air gap length.

However, problem with the coil structure of FIG. 2 is that it is difficult to manufacture the structure such that the coils are stacked in constant intervals. In particular, while the feature of the coil structure of FIG. 2 is to minimize the air gap length by compressing the parts where the coils overlap, the effective air gap length is nevertheless increased compared to a non-overlapping state, and depending on the level of manufacturing technology, there is a high probability of the air gaps being non-uniform.

The coil structure illustrated in FIG. 3 has the coils arranged facing each other, with both ends of a coil having a smaller horizontal width placed in an overlapping manner within the two ends of a coil having a larger horizontal width.

In the coil structure of FIG. 3 also, the effective air gap length is different at the parts where the coils overlap, possibly causing a difference in inductance between the coils, and moreover, individually arranging and securing the several coils to face each other can be a cumbersome process.

SUMMARY OF THE INVENTION

An aspect of the present invention is to provide a slotless electric motor, and a coil unit of the slotless motor, where the coil unit has the same effective air gap length at any given point, there is no risk of lowered output caused by an increase in effective air gap length, there is reduced risk of phase imbalance, and the coil unit has a very simple structure to also provide an advantage in terms of manufacture.

One aspect of the present invention discloses a coil unit for a slotless motor having a two-phase structure.

In a coil unit of a slotless electric motor according to an embodiment of the present invention, a first coil and a second coil may be formed overlapping each other such that a first end turn of the first coil and a first end turn of the second coil face each other and a first coil-side of the second coil is inserted between the two coil-sides of the first coil, and the first coil and second coil may be formed such that the end portions of the two coil-sides connect to the first end turn and the second end turn having curved shapes, with the first end turn folded to form a pre-configured angle with respect to the two coil-sides.

The first end turn and the two coil-sides may form a right angle.

The bent portion of the first end turn may be formed in a curved shape such as not to be caught when multiple coils are overlapped over one another and may be caught on the second end turn.

The first coil and the second coil may be formed such that the width between the two coil-sides corresponds to the width of one coil-side, so that a coil-side may be inserted between the two coil-sides.

Another aspect of the present invention discloses a coil unit for a slotless motor having a three-phase structure.

In a coil unit of a slotless electric motor according to an embodiment of the present invention, a first coil, a second coil, and a third coil may be formed overlapping one another such that a first end turn of the first coil and the first end turns of the second coil and the third coil face each other and a second coil-side of the second coil and a first coil-side of the third coil are inserted between the two coil-sides of the first coil, and the first coil, the second coil, and the third coil may be formed such that the end portions of the two coil-sides connect to the first end turn and the second end turn having curved shapes, with the first end turn folded to form a pre-configured angle with respect to the two coil-sides.

The first coil, the second coil, and the third coil may be formed such that the width between the two coil-sides corresponds to the width of two coil-sides, so that two coil-sides may be inserted between the two coil-sides.

With a slotless motor and a coil unit of a slotless motor according to an embodiment of the present invention, the effective air gap length can be made the same at any given point, the risk of lowered output due to an increase in effective air gap length can be eliminated, the risk of phase imbalance can be reduced, and the structure can be greatly simplified to also provide an advantage in terms of manufacture.

DETAILED DESCRIPTION OF THE INVENTION

In the present specification, an expression used in the singular encompasses the expression of the plural, unless it has a clearly different meaning in the context. In the present specification, terms such as "comprising" or "including," etc., should not be interpreted as meaning that all of the components or steps are necessarily included. That is, some of the components or steps may not be included, while other additional components or steps may be further included. Also, terms such as "part", "module", etc., used in the present specification refer to a unit that processes at least one function or operation, where such a unit can be implemented as hardware or software or as a combination of hardware and software.

Various embodiments of the invention will be described below in more detail with reference to the accompanying drawings.

Figure 1:
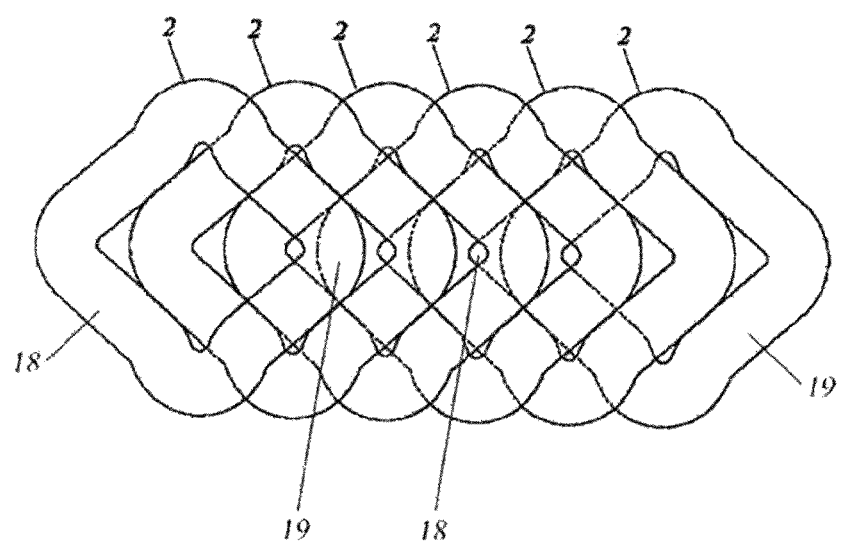
FIG. 1, FIG. 2, and FIG. 3 illustrate the coil structures of slotless motors according to the related art.
Figure 2:
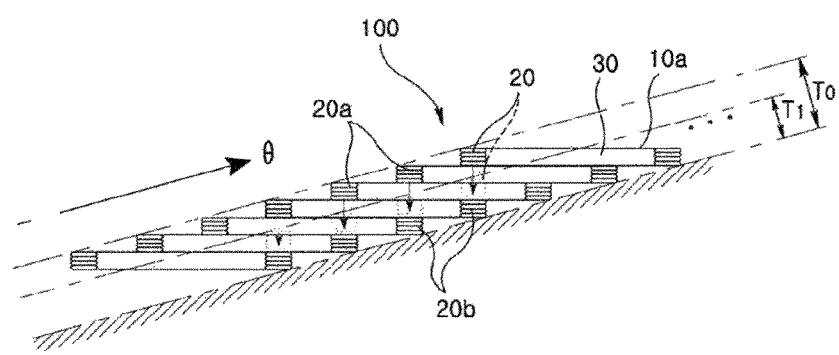
Figure 3:
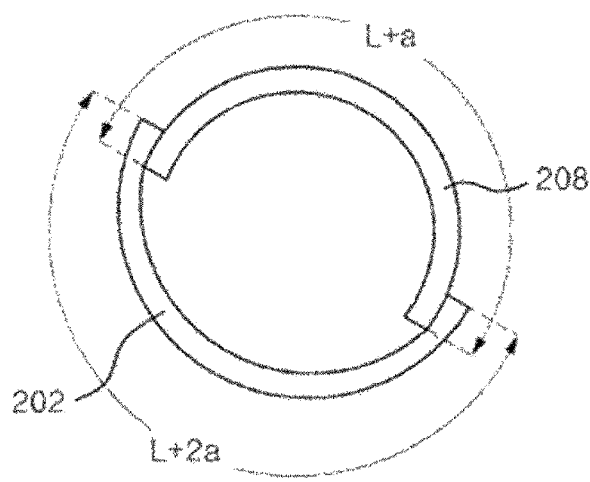
Figure 4:
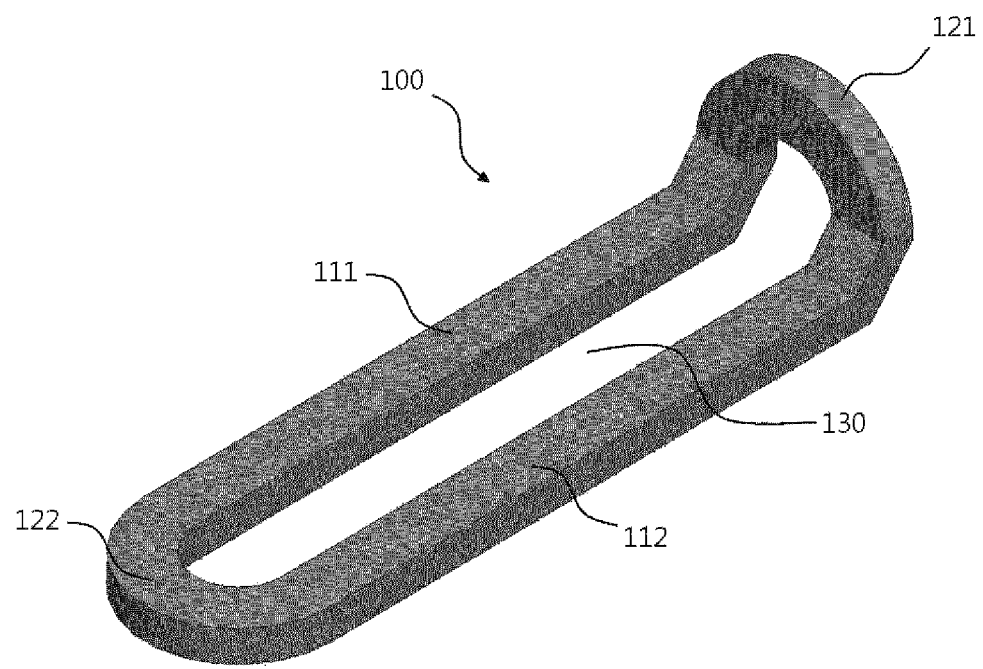
FIG. 4 illustrates the coil structure of a slotless motor according to an embodiment of the present invention.
Figure 5:
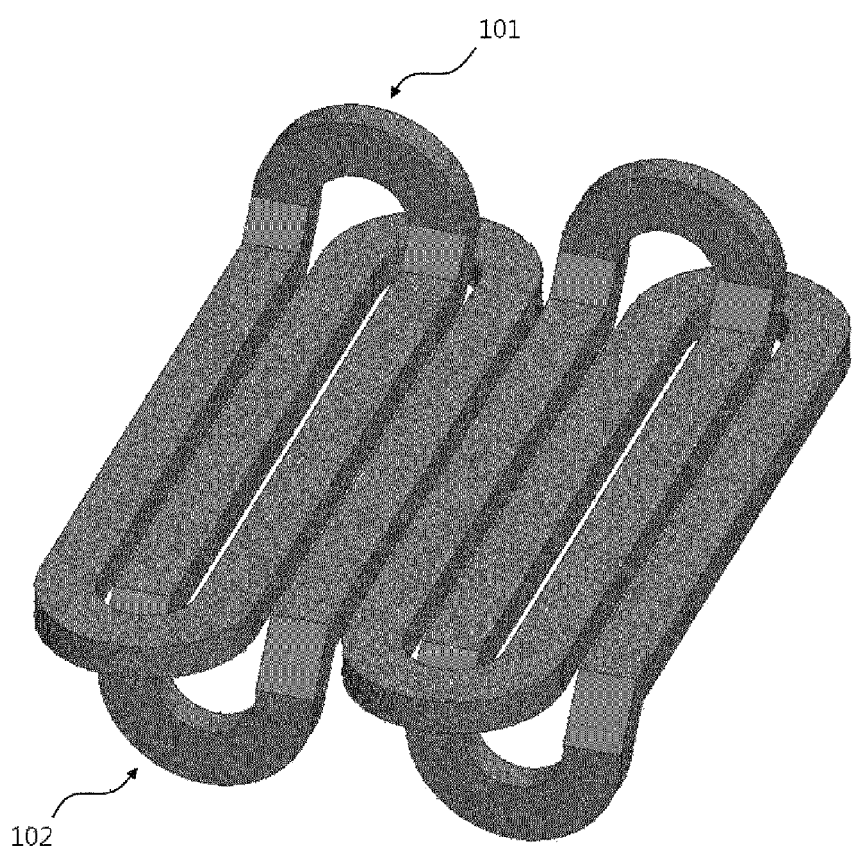
FIG. 5 illustrates the structure of the coil unit of a slotless motor according to an embodiment of the present invention.
Figure 6:
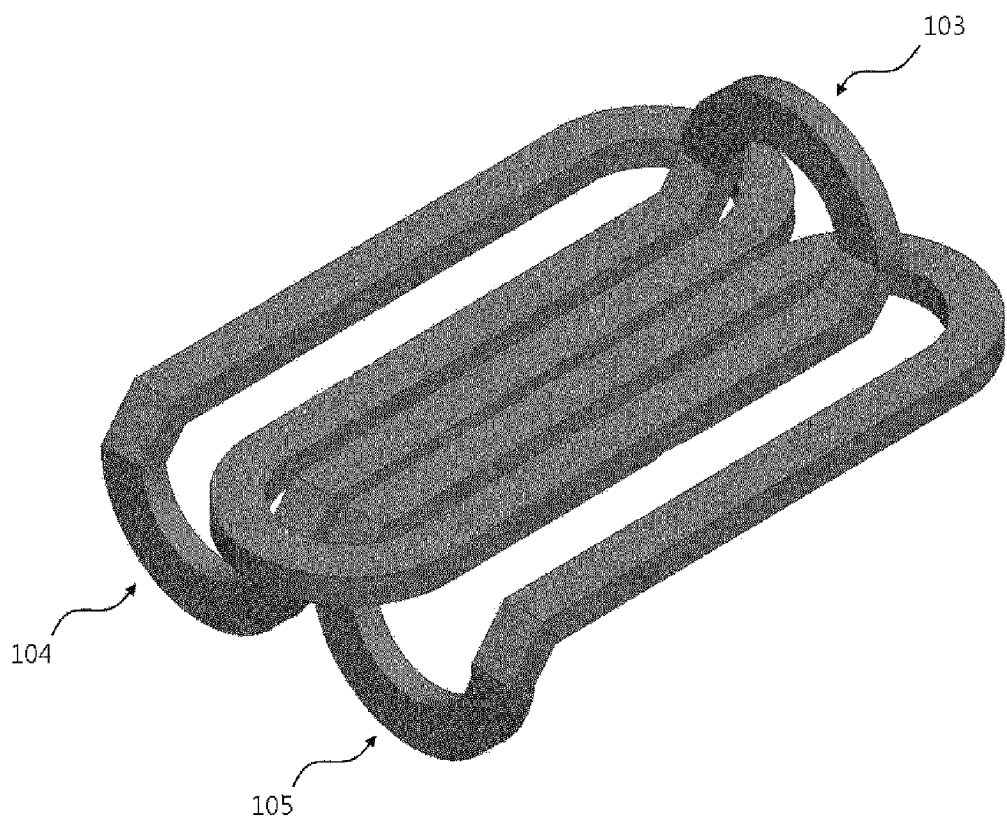
FIG. 6 illustrates the structure of the coil unit of a slotless motor according to another embodiment of the present invention.

FIG. 4 illustrates the coil structure of a slotless motor according to an embodiment of the present invention, FIG. 5 illustrates the structure of the coil unit of a slotless motor according to an embodiment of the present invention, and FIG. 6 illustrates the structure of the coil unit of a slotless motor according to another embodiment of the present invention.

Referring to FIG. 4, a coil 100 for a slotless motor according to an embodiment of the present invention may be shaped as an elongated circle having one end portion 120 folded.

That is, as illustrated in FIG. 4, the coil 100 can have the end portions of two parallel coil-sides 111, 112 connecting to a first end turn 121 and a second end turn 122, which have curved shapes, and the first end turn 121 can be formed in a folded shape to form a pre-configured angle with the two coil-sides 111, 112. For example, the first end turn 121 and the two coil-sides 111, 112 can form a right angle. Also, the bent portion at the first end turn 121 can be formed in a curved shape such as not to be caught when multiple coils 100 are placed overlapping one another.

Here, a space 130 can be formed between the two parallel coil-sides 111, 112 into which at least one coil-side may be placed. That is, the width between the two coil-sides 111, 112 can correspond to the width of one or two coil-sides 111, 112. For example, the width between the two coil-sides 111, 112 can be greater than the width of the coil-sides 111, 112.

The coil 100 may be insulated, and the folded angle of the first end turn 121 with respect to the first end turn 121 and the second end turn 122 may not have a great impact.

Referring to FIG. 5, FIG. 5 shows a two-phase structure of a coil unit for a slotless motor according to an embodiment of the present invention.

As illustrated in FIG. 5, the coil unit of the slotless motor can be formed such that the first end turn 121 of the first coil 101 and the first end turn 121 of the second coil 102 face each other, where the first coil 101 and the second coil 102 may be overlapped in a manner such that the first coil-side 111 of the second coil 102 is inserted between the two coil-sides 111, 112 of the first coil 101. Here, the bent portion of the folded first end turn 121 may be caught on a second end turn 122.

In the coils 101, 102 of FIG. 5, the width between the two coil-sides 111, 112 can correspond to the width of one coil-side 111, 112 such that one coil-side can be placed between the two parallel coil-sides 111, 112.

In this way, the winding of the slotless motor can be formed with the coil-sides 111, 112 of many coils 100 arranged alternatingly in an interlocking manner.

Referring to FIG. 6, FIG. 6 shows a three-phase structure of a coil unit for a slotless motor according to an embodiment of the present invention.

As illustrated in FIG. 6, the coil unit of the slotless motor can be formed such that the first end turn 121 of the third coil 103 and the first end turns 121 of the fourth coil 104 and fifth coil 105 face each other, where the third coil 103, fourth coil 104, and fifth coil 105 may be overlapped in a manner such that the second coil-side 112 of the fourth coil 104 and the first coil-side 111 of the fifth coil 105 are inserted between the two coil-sides 111, 112 of the third coil 103. Here, the bent portion of the folded first end turn 121 may be caught on the second end turns 122.

In the coils 103, 104, 105 of FIG. 6, the width between the two coil-sides 111, 112 can correspond to the width of two coil-sides 111, 112 such that two coil-sides can be placed between the two parallel coil-sides 111, 112.

In this way, the winding of the slotless motor can be formed with the coil-sides 111, 112 of many coils 100 arranged alternatingly in an interlocking manner.

The embodiments of the present invention set forth above are disclosed only for illustrative purposes. The person having ordinary skill in the art familiar with the present invention would be able to make various modifications, alterations, and additions without departing from the spirit and scope of the present invention, and such modifications, alterations, and additions are to be regarded as being encompassed by the scope of claims set forth below.

What is claimed is:

1. A coil unit of a slotless electric motor having a two-phase structure, comprising:
a first coil comprising two coil-sides, a first end turn arranged at one end portion of the two coil-sides of the first coil and bent with respect to the two coil sides of the first coil, and a second end turn arranged at another end portion of the two coil-sides of the first coil and coplanar with the two coil-sides of the first coil; and a second coil comprising two coil-sides, a first end turn arranged at one end portion of the two coil-sides of the second coil and bent with respect to the two coil sides of the second coil, and a second end turn arranged at another end portion of the two coil-sides of the second coil and coplanar with the two coil-sides of the second coil, wherein the first coil and the second coil are arranged such that the first end turn of the first coil and the first end turn of the second coil are positioned at opposite end portions of the two coil-sides, and one of the two coil-sides of the second coil is inserted between the two coil-sides of the first coil, wherein the first end turns and the second end turns of the first and second coils have curved shapes, and wherein each first end turn of the first and second coils includes an inclined portion that connects each of the two coil-sides to an end portion of the first end turn such that the end portion of the first end turn is bent at a right angle with respect to the two coil-sides.

2. The coil unit of a slotless electric motor according to claim 1, wherein the first coil and the second coil are formed to have a width between the two coil-sides such that a coil-side of one of the first and second coils is inserted between two coil-sides of the other of the first and second coils.

3. A slotless motor comprising the coil unit according to claim 1.

4. A coil unit of a slotless electric motor having a three-phase structure, comprising:

a first coil comprising two coil-sides, a first end turn arranged at one end portion of the two coil-sides of the first coil and bent with respect to the two coil sides of the first coil, and a second end turn arranged at another end portion of the two coil-sides of the first coil and coplanar with the two coil-sides of the first coil;

a second coil comprising two coil-sides, a first end turn arranged at one end portion of the two coil-sides of the second coil and bent with respect to the two coil sides of the second coil, and a second end turn arranged at another end portion of the two coil-sides of the second coil and coplanar with the two coil-sides of the second coil; and a third coil comprising two coil-sides, a first end turn arranged at one end portion of the two coil-sides of the third coil and bent with respect to the two coil sides of the third coil, and a second end turn arranged at another end portion of the two coil-sides of the third coil, and coplanar with the two coil-sides of the third coil;

wherein the first coil, the second coil, and the third coil overlap such that the first end turn of the first coil and first end turns of the second coil and the third coil are positioned at opposite end portions of the two coil-sides, and one of the two coil-sides of the second coil and one of the two coil-sides of the third coil is inserted between the two coil-sides of the first coil, wherein the first end turns and the second end turns of the first, second, and third coils have curved shapes, and wherein each first end turn of the first, second and third coils includes an inclined portion that connects each of the two coil-sides to an end portion of the first end turn such that the end portion of the first end turn is bent at a right angle with respect to the two coil-sides.

5. The coil unit of a slotless electric motor according to claim 4, wherein the first coil, the second coil, and the third coil are formed to have a width between the two coil-sides such that two coil-sides respectively belonging to different coils are inserted between two coil-sides of another coil among the first, second, and third coils.

* * * * *